United States Patent [19]

Matthews et al.

[11] 4,415,266

[45] Nov. 15, 1983

[54] PHASE-LOCKED LOOP LASER GYROSCOPE SYSTEM

[75] Inventors: James B. Matthews, Wayland; Reno A. DeLuzio, Milford, both of Mass.

[73] Assignee: Raytheon Company, Lexington, Mass.

[21] Appl. No.: 184,672

[22] Filed: Sep. 5, 1980

Related U.S. Application Data

[63] Continuation of Ser. No. 894,267, Apr. 7, 1978, abandoned.

[51] Int. Cl.³ .............................................. G01C 19/64
[52] U.S. Cl. ................................................... 356/350
[58] Field of Search .............................. 356/350, 351; 331/94.5 S

[56] References Cited

U.S. PATENT DOCUMENTS

| | | | |
|---|---|---|---|
| 3,469,922 | 9/1969 | Coccoli et al. | 356/350 |
| 3,508,831 | 4/1970 | Macek | 356/350 |
| 3,537,027 | 10/1970 | Smith | 331/94.5 S |
| 3,596,201 | 7/1971 | Chester | 331/94.5 S |
| 3,644,841 | 2/1972 | Smith | 331/94.5 S |
| 3,697,181 | 10/1972 | Macek et al. | 356/350 |
| 3,741,657 | 6/1973 | Andringa | 356/350 |
| 3,807,866 | 4/1974 | Zingery | 356/350 |
| 3,846,025 | 11/1974 | Wilber | 356/350 |
| 3,854,819 | 12/1974 | Andringa | 356/350 |
| 3,892,486 | 7/1975 | Ferrar | 356/350 |

*Primary Examiner*—Vincent P. McGraw
*Attorney, Agent, or Firm*—Walter F. Dawson; Joseph D. Pannone; Richard M. Sharkansky

[57] ABSTRACT

A very high resolution laser gyroscope system having a phase-locked loop operatively coupled to the output of a laser gyroscope cavity. A difference frequency signal is formed between two output beams from the gyroscope cavity. The phase of the difference signal is compared with that of a reference clock to produce a signal representative of the phase difference between the reference clock and difference signal. The latter signal is amplified and coupled to a coil which produces a field within a Faraday rotator body disposed in the wave propagation path within the laser gyroscope cavity. The phase of the difference signal is thus phase-locked to that of the reference clock signal so that the frequency difference between the two beams in the cavity is maintained constant over a wide range of rates of rotation.

24 Claims, 9 Drawing Figures

PHASE-LOCKED LOOP LASER GYROSCOPE SYSTEM

CROSS-REFERENCE TO RELATED CASES

This is a continuation of application Ser. No. 894,267, filed Apr. 7, 1978, now abandoned.

BACKGROUND OF THE INVENTION

1. Field of the Invention

The invention pertains broadly to laser gyroscope systems. More particularly, the invention relates to laser gyroscope systems in which high precision and high resolution output signals are required.

2. Description of the Prior Art

One of the primary problems which must be overcome to provide a useful laser gyroscope system is that of mode locking. In an uncompensated system in which no provision is made for overcoming this problem, for low angular rates of rotation, the frequency difference produced between wave pairs circulating in their laser gyroscope cavity are less than would be predicted were not for the mode locking phenomena. In fact, the actual frequency difference output only asymptotically approaches the desired linear relationship between output frequency difference and rate of rotation as the actual rate of rotation is increased.

Numerous laser gyroscope structures have been proposed for eliminating or substantially reducing this mode locking problem. Among the most successful of these systems is that shown and described in the U.S. Pat. Nos. 3,741,657 and 3,854,819, both to Keimpe Andringa and assigned to the present assignee, the specifications thereof being incorporated by reference herein. In the patented systems, beams of four separate frequencies propagate around a closed laser gyroscope path defined by four mirrors. Two beams circulate in the clockwise direction and two in the counterclockwise direction. Of the two clockwise circulating beams, one is of left-hand circular polarization and the other of right-hand circular polarization as is also the case for the two counterclockwise circulating beams. In the preferred embodiment, the two beams of right-hand circular polarization are of higher frequency than those of left-hand circular polarization. A Faraday rotator structure provides the frequency difference or splitting between the beams of clockwise and counterclockwise rotation while the crystal rotator structure provides the frequency splitting between the beams of right-hand and left-hand polarization.

Figure 2:
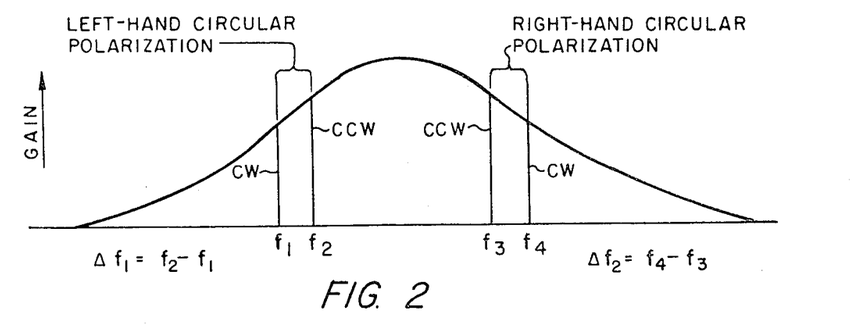
FIG. 2 is a diagram illustrating the frequency line distribution and gain medium characteristics of the laser gyroscope system of the invention.

The relative frequency positions of the beams of four different frequencies are shown in the diagram of FIG. 2. To avoid the mode locking problem, the Faraday rotator provides sufficient frequency splitting between the beams of frequency $f_1$ and $f_2$ as well as between the beams of frequencies $f_3$ and $f_4$ at a zero rate of rotation and for all anticipated rates of rotation such that no mode locking can occur and the system is biased substantially outside the nonlinear region where mode locking occurs.

At rest, the frequency difference between the beams of frequency $f_1$ and $f_2$ is the same as that between the beams of frequencies $f_3$ and $f_4$. As the laser gyroscope system is rotated in a first direction, the beams of frequencies $f_1$ and $f_2$ will move together in frequency while those of $f_3$ and $f_4$ will move apart in frequency by the same amount. For rotation in the opposite direction, the beams of frequency $f_1$ and $f_2$ will move apart in frequency while those of $f_3$ and $f_4$ will move together by the same amount.

To produce an output signal having a frequency in proportion to the rate of rotation, a first two output frequency difference signals having frequencies $\Delta f_1 = f_2 - f_1$ and $\Delta f_2 = f_4 - f_3$ are formed. A final output signal $\Delta f = \Delta f_2 - \Delta f_1$ is then formed. To provide an indication of the total amount of rotation, two counters are provided, one of which is incremented by the $\Delta f_1$ signal and the other by the $\Delta f_2$ signal. The output of one counter is digitally subtracted from that of the other thus providing a digital signal indicative of the total amount of rotation of the system.

Although this system described in the Andringa patents has been found to function quite satisfactorily for numerous applications, in still further applications it has been found desirable to provide an output signal indicating either the amount of rotation or rate of rotation having a higher degree of precision than quantizing the $\Delta f_1$ and $\Delta f_2$ signals at one pulse per cycle of the signals can provide.

SUMMARY OF THE INVENTION

Accordingly, it is an object of the present invention to provide a laser gyroscope system having a highly precise output signal.

Moreover, it is an object of the present invention to provide such a system in which quantization of the output signal is achieved at a much higher rate than straightforward quantization of the normal output signals would provide.

These, as well as other objects of the invention, may be met by providing the combination of means for providing a closed-loop path for sustaining propagation of electromagnetic waves of a plurality of frequencies and a phase-locked loop coupled to an output from the path, the output having a signal related to the frequency of at least one of the waves propagating around the closed-loop path. Preferably, the output signal has a frequency substantially equal to the difference in frequency between at least two of the electromagnetic waves. The closed-loop path providing means may include at least three reflecting means and a laser gain medium. First and second frequency dispersive elements are also disposed in the path. The phase-locked loop preferably includes means for varying the difference in frequency between at least two of the electromagnetic waves. One of the frequency dispersive elements is preferably a Faraday rotator body. The frequency varying means may then be a coil for producing a magnetic field in the Faraday rotator body in response to an output signal from the phase-locked loop. As used herein, the term signal refers to information conveyed upon a single or plural lines.

The invention may further be practiced by providing the combination of means for providing a closed-loop path for sustaining propagation of electromagnetic waves of two frequencies, means for producing a first signal having a frequency equal to the difference in frequency between the electromagnetic waves of two frequencies, means for producing a second signal of a predetermined fixed frequency, means for producing a third signal having an amplitude in proportion to the difference in phase between the first and second signals, and means for varying the frequency difference between the two electromagnetic waves in accordance with a parameter of the third signal. In the preferred embodiment, the frequency varying means maintains the frequency difference between the two output beams at a constant value over a predetermined range of rates of rotation. The means for producing the third signal preferably includes phase detecting means with the first and second signals being coupled to inputs of the phase detecting means and a low-pass filter means. Further, there may be provided means for amplifying the third signal with the frequency varying means being coupled to the output of the amplifying means. Prior to or following the amplifying means there may be provided means for summing the third signal, amplified or not, with a fixed signal or voltage. But still further there may be provided means for repetitively changing, that is reversing, the direction of current flow through the frequency varying means.

Objects of the invention may also be met by providing the combination of means for providing a closed-loop path for sustaining propagation of electromagnetic waves of two frequencies, detecting means for producing a first signal having a frequency equal to the difference in frequency between the previously mentioned two frequencies, means for amplifying the first signal, phase detecting means with the first signal being coupled to a first input of the phase detecting means, means for producing a second signal of fixed frequency with that signal being coupled to a second input of the phase detecting means, low-pass filtering means coupled to the output of the phase detecting means, means for amplifying the output of the low-pass filtering means which may be incorporated as a single unit with the low-pass filtering means, and a coil coupled to the output of the means for amplifying the output of the low-pass filtering means with the coil being positioned to vary the frequency difference in accordance with the amplitude and direction of the field produced by the coil. There may further be provided means for cyclically changing or reversing the direction of current flow through the coil. The means for cyclically changing the direction of current flow through the coil includes switching means coupled to the output of the means for amplifying the output of the low-pass filtering means and means for cyclically operating the switching means. There may further be included for producing a digital output signal means for converting an analog signal to a digital signal with the input of the converter means being coupled to the output of the low-pass filtering means amplified or not. The output of the low-pass filtering means may be summed with a fixed voltage either prior to or following amplification. The cavity includes a Faraday rotator element with the coil being positioned so that the field produced by the coil extends within the body of the Faraday rotator element. Alternately, the coil may be positioned around the laser gain medium of the cavity.

DESCRIPTION OF THE PREFERRED EMBODIMENTS

Figure 1:
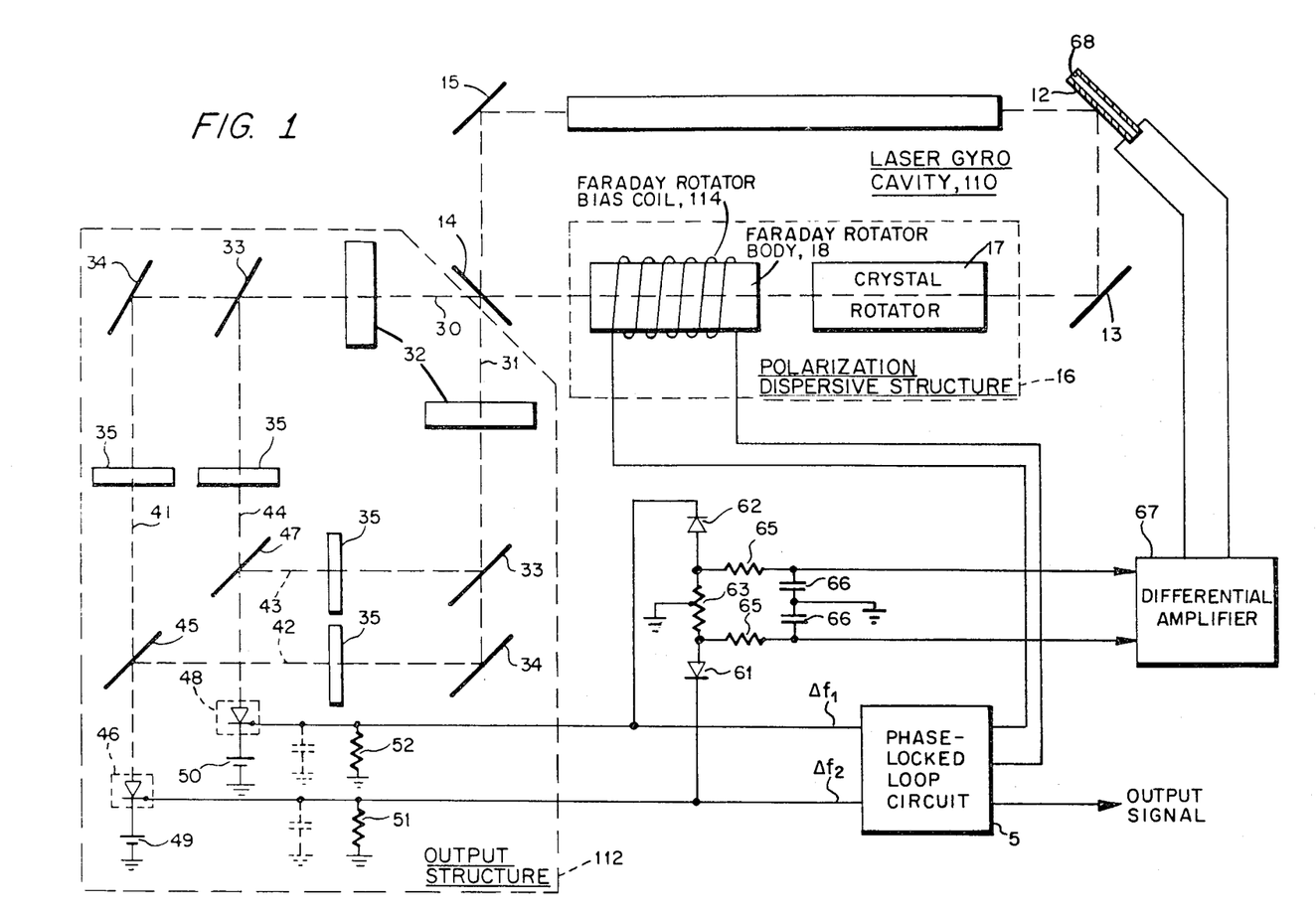
FIG. 1 is a diagrammatic view of a laser gyroscope system in accordance with the invention.

Referring first to the view of FIG. 1, there is shown therein in diagrammatic form a laser gyroscope system in which the present invention is used to advantage. A generally rectangularly shaped laser gyro cavity 110 is defined by mirrors 12–15. Along one leg of cavity 110 in the path of the electromagnetic waves which propagate around the path is disposed laser gain medium 10. Laser gain medium 10 may be formed as a sealed chamber containing gases such as a mixture of isotopes of helium and neon. The amount of gain afforded the various electromagnetic waves is, as is well known, a function of frequency of the waves. As shown in the view of FIG. 2, the laser gain curve 11 for the chosen gain medium is substantially bell shaped. Along the leg of laser gyro cavity 110 opposite laser gain medium 10 is disposed polarization dispersive structure 16. Two separate polarization dispersive elements are provided within polarization dispersive structure 16.

Crystal rotator 17 provides a delay or, equivalently, a phase shift, for circularly polarized waves that is different for one sense of circular polarization than for the other. That is, the delay or phase shifts are different for waves of right-hand circular polarization than for those of left-hand circular polarization. Moreover, the delay is reciprocal in that the delay imparted to a particular wave depends only upon its sense of polarization and not upon its direction of propagation through the crystal.

Adjacent crystal rotator 17 within polarization dispersive structure 16 is positioned Faraday rotator 18. Faraday rotator 18 is constructed using either a crystalline or noncrystalline center core through which is applied a constant magnetic field from an external permanent magnet, not shown. Fused quartz is the preferred material. Faraday rotator 18 provides a delay or phase shift which is different for waves propagating through it in one direction than the other. The delay imparted the waves is independent of the sense of polarization. A second magnetic field is produced in the body of Faraday rotator 18 by Faraday rotator bias coil 114. The magnetic field produced by Faraday rotator bias coil 114 may be in either direction depending upon the direction of current flow in the coil. Faraday rotator bias coil 114 forms part of a phased-locked loop circuit 5 as will be described below.

Referring again to the view of FIG. 2, it shows that waves of four distinct frequencies $f_1$, $f_2$, $f_3$, and $f_4$ are produced by the apparatus shown in FIG. 1. The waves of frequencies $f_1$ and $f_4$ are waves propagating in the clockwise direction while the waves of frequencies $f_2$ and $f_3$ are waves propagating in the counterclockwise direction. The waves of frequencies $f_1$ and $f_2$ are left-hand circularly polarized while those of frequencies $f_3$ and $f_4$ are right-hand circularly polarized. As may be appreciated from the description above, the splitting between the left-hand and right-hand circularly polarized beams is caused by crystal rotator 17 while the splitting between the clockwise and counterclockwise beams is produced by Faraday rotator 18.

As the system of FIG. 1 is rotated about is sensitive axis, for a first direction of rotation, the waves of frequencies $f_3$ and $f_4$ move closer together in frequency while those of $f_1$ and $f_2$ move apart in frequency by the same amount as $f_3$ and $f_4$ move together. For the opposite direction of rotation, the waves of frequencies $f_1$ and $f_2$ move closer together in frequency while those of $f_3$ and $f_4$ move apart in frequency again by the same amount.

To produce an output signal indicative of the rate of rotation of the system or, alternatively, of the total amount of rotation since a predetermined time, two different signals $\Delta f_1 = f_2 - f_1$ and $\Delta f_2 = f_4 - f_3$ are formed. At rest, $\Delta f_1 = \Delta f_2$. To form an output signal indicative of the rate of rotation at any particular instant, a second difference signal $f = \Delta f_2 - \Delta f_1$ is formed. To determine the total amount of rotation since a predetermined time, an integral of the f signal is performed. The integral may be formed with an analog circuit but is preferably done digitally for increased accuracy.

The frequency difference signals $\Delta f_1$ and $\Delta f_2$ are produced by output structure 112. Mirror 14 is constructed to be partially transmitting so that a small portion of each of the four waves circulating in laser gyro cavity 110 are passed through the mirror to output structure 112. Clockwise propagating waves pass through mirror 14 along path 30 while the clockwise circulating beam waves are coupled out along path 31. The extracted beams pass through quarter-wave plates 32, the thickness of which is chosen in accordance with well-known principles such that the circularly polarized waves are converted to linearly polarized waves with the linearly polarized waves, corresponding to the waves of right-hand circular polarization, being substantially orthogonal to those corresponding to the waves of left-hand circular polarization.

The linearly polarized waves are split into beams of substantially equal amplitude by half-silvered mirrors 33 and 34. The four beams are then passed through polarization analyzers 35 to produce the four beams at 41, 42, 43, and 44 each of which contains a wave of only one of frequencies $f_1$, $f_2$, $f_3$, and $f_4$ as the polarization analyzers pass only one angle of linearly polarized waves. The waves having frequencies $f_1$ and $f_2$ are shone upon half-silvered mirror 47 and reflected towards detector diode 48 while those of frequencies $f_3$ and $f_4$ are reflected by half-silvered mirror 45 to detector diode 46. Detector diodes 46 and 48 are reversed biased by voltage sources 49 and 50 to produce the desired operating characteristics as is well known in the detector diode art. Detector diodes 46 and 48 produce an output signal which has a frequency equal to the difference in frequency between the two input waves incident upon each diode. The output signals appear across resistors 51 and 52. Higher frequency output signals such as those having a frequency equal to the sum of the frequencies of the incident waves are filtered out by the stray capacitances appearing across each diode and do not form a part of the output signal.

In systems operation, it is desirable that the waves of the four frequencies be centered symmetrically about the peak of the gain curve. To this end, a piezoelectric transducer 68 is provided to mechanically position mirror 12 to adjust the total path length within laser gyro cavity 110 to properly center the four frequencies. To derive a signal for operating piezoelectric transducer 68, signals are formed having an amplitude in proportion to the total amplitudes of the corresponding $\Delta f_1$ and $\Delta f_2$ signals and a difference formed between the two amplitude related signals. The output difference signal of course has a zero amplitude when the waves of the four frequencies are properly centered upon the gain curve. The output difference signal is of one polarity when the four waves are off center in one direction and the opposite plurality when the waves are off center in the other direction. The average amplitude signals are formed by the network including diodes 61 and 62, resistors 63, 64, and 65, and capacitor 66. The output difference signal is formed by differential amplifier 67, the output of which is coupled to the input leads of piezoelectric transducer 68.

In accordance with the principles of the invention, a phase-locked loop circuit 5 receives the input frequency difference signals and from them produces a highly precise output signal representing the rate of rotation of the system or the total amount of rotation or both of these. Also, in the embodiment shown in FIG. 1, phase-locked loop circuit 5 produces a signal coupled to Faraday rotator bias coil 114 for controlling the frequency difference between at least one of the wave pairs. In some embodiments, Faraday rotator coil 18 may be omitted.

Referring next to the block diagram of FIG. 3, the operation of phase-locked loop circuit 5 will be described in more detail. The $\Delta f_1$ frequency difference signal from output structure 112 is coupled to one input of phase detector 116. To the other input of phase detector 116 is coupled the output of reference clock 118. The output signal from phase detector 116 representing the difference in phase between the reference clock signal and $\Delta f_1$ signal is coupled to amplifier 120 through low-pass filter 119. Low-pass filter 119 may alternately follow amplifier 120 or may be incorporated therewith such as in a feedback arrangement. The output of amplifier 120 is coupled back to Faraday bias coil 114 amplified by coil driver amplifier 115.

The signal applied to Faraday bias coil 114 from the output of amplifier 115 causes a magnetic field to be produced in the body of Faraday rotator 18 of FIG. 1 such that the change in frequency of two of the four waves propagating within laser gyro cavity 110 caused by rotation of the system are opposed and nulled out over wide range of rates of rotation. Thus, as the system is rotated, one of the frequency difference signals will not change. However, the rate of rotation will be precisely indicated by the amplitude of the output signal from amplifier 120.

Figure 3:
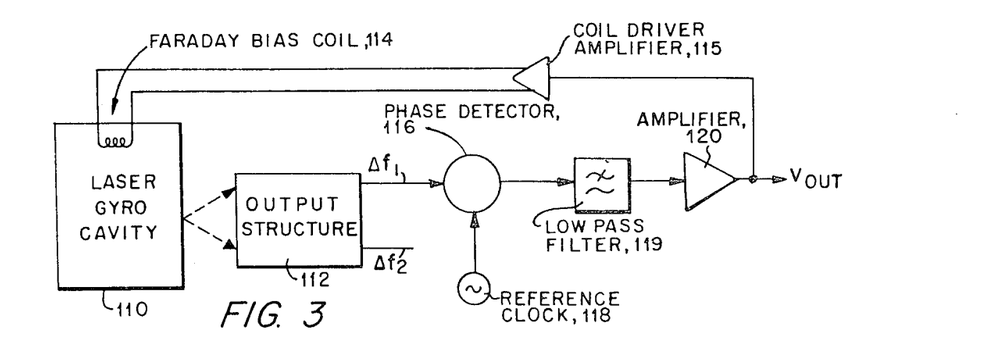
FIGS. 3–6 and 9 are block diagrams of various embodiments of the invention.

The system shown in FIG. 3 has a number of advantages over the prior art. First, there is no quantization error in the rate output signal as the rate of rotation is indicated by a highly precise analog voltage and not by the frequency of a signal which is of course subject to the quantization error. If a digital output is desired, the output signal from amplifier 120 may be digitized using an analog-to-digital converter at any desired level of precision. Secondly, with the apparatus shown in FIG. 3, there is no residual error caused by the lock-in effect because no change of frequency takes place within laser gyro cavity 110 for the signals from which the output is derived.

Figure 4:
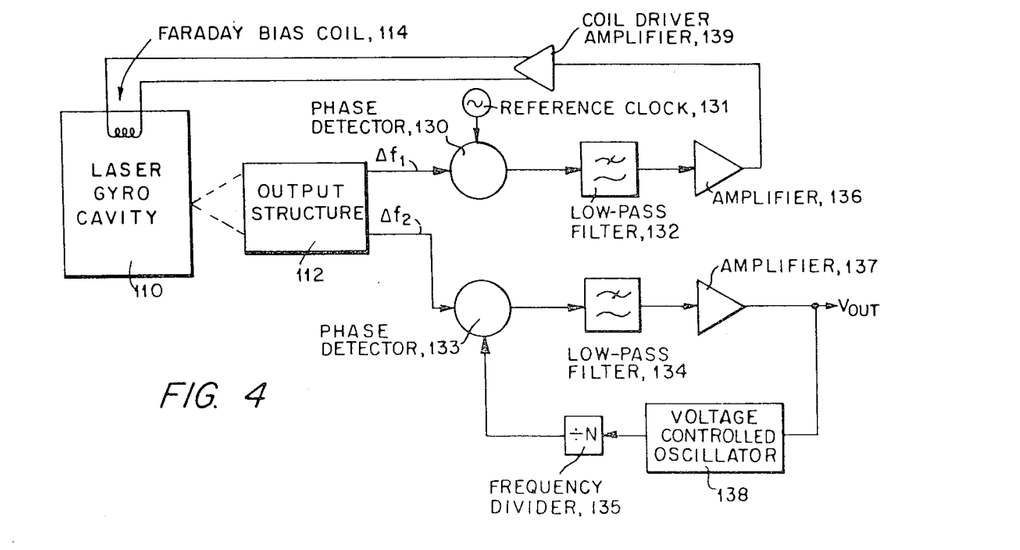

Referring next to the block diagram of FIG. 4, there is shown a further embodiment of the invention. The system shown in the embodiment of FIG. 4 operates in the same manner as that shown in FIG. 3 but with the addition of a second phase-locked loop to the system. To the $\Delta f_2$ output signal from output structure 112 is coupled to one input of second phase detector 133. A low-pass filter 134 and an amplifier 137 are coupled to the output of phase detector 133 in the same manner as the system discussed in reference to FIG. 3. To the output of amplifier 137 is coupled high precision voltage-controlled oscillator 138. The frequency of the output signal produced by voltage-controlled oscillator 138 is determined by the amplitude of the output signal from amplifier 137. Frequency divider 135 divides down the output signal from voltage-controlled oscillator 138 producing an output signal which has the same frequency as $\Delta f_2$ when the system is at rest.

With the embodiment of the invention shown in FIG. 4, the $\Delta f_1$ frequency difference is maintained at a constant value independent of the rate of rotation of the system. Because the $\Delta f_1$ signal is a constant, the $\Delta f_2$ signal will vary by twice the amount for a given rate of rotation than it would if the $\Delta f_1$ signal were also permitted to vary. Thus, the analog output signal $V_{out}$ from amplifier 137 has an amplitude twice that as would be produced in a nonphase-locked system and with no addition of noise.

Figure 5:
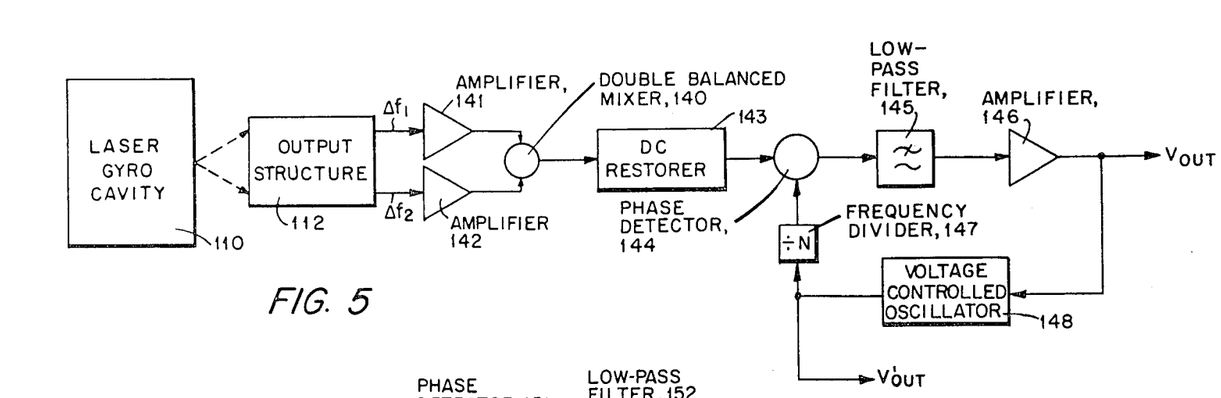

Referring next to the block diagram of FIG. 5, there is shown still another embodiment of the invention. In the embodiment shown in FIG. 5, the phase-locked loop circuitry is entirely outside laser gyro cavity 110. The $\Delta f_1$ and $\Delta f_2$ signals are amplified by buffer amplifiers 141 and 142 and coupled as the two inputs to double balanced mixer 140. The output signal $\Delta f = \Delta f_2 - \Delta f_1$ from double balanced mixer 140 is of a frequency which is directly indicative of the rate of rotation of the system. However, as the $\Delta f$ signal has a typical frequency range of 100 to 500 HTz. for a typical laser gyro cavity construction, a simple digitization of the $\Delta f$ signal quantizing the signal as one counter pulse per cycle of the signal contains a large amount of quantizing error. This error is largely eliminated with this embodiment of the invention.

The DC level of the $\Delta f$ signal is set by DC restorer circuit 143 such that a zero frequency of the $\Delta f$ signal, corresponding to a zero rate of rotation of the system, produces a zero output voltage. The DC restored signal is coupled to one input of phase detector 144 which is the input point of the phase-locked loop circuitry. The output of phase detector 144 is coupled through low-pass filter 145 and amplifier 146. As in the previous embodiments, the output of amplifier 146 is coupled through voltage controlled oscillator 148 and frequency divider 147 to the second input of phase detector 144.

Two output signals are produced from the phase-locked loop. The $V_{out}$ signal from amplifier 146 is an analog signal the amplitude of which is in direct proportion to the rate of rotation of the system. This analog signal is highly precise and has no quantization error. The second output signal $V'_{out}$ is produced at the output of voltage-controlled oscillator 148. The frequency of the $V'_{out}$ signal is N times that of the $\Delta f$ signal. Thus, the $V'_{out}$ signal may be digitized with a precision of N times that of a digitization of the $\Delta f$ signal. In the circuitry implementation described below, N is typically of the order of 233. Hence, it is readily appreciated that a large reduction in quantization error has been achieved with the invention.

Figure 6:
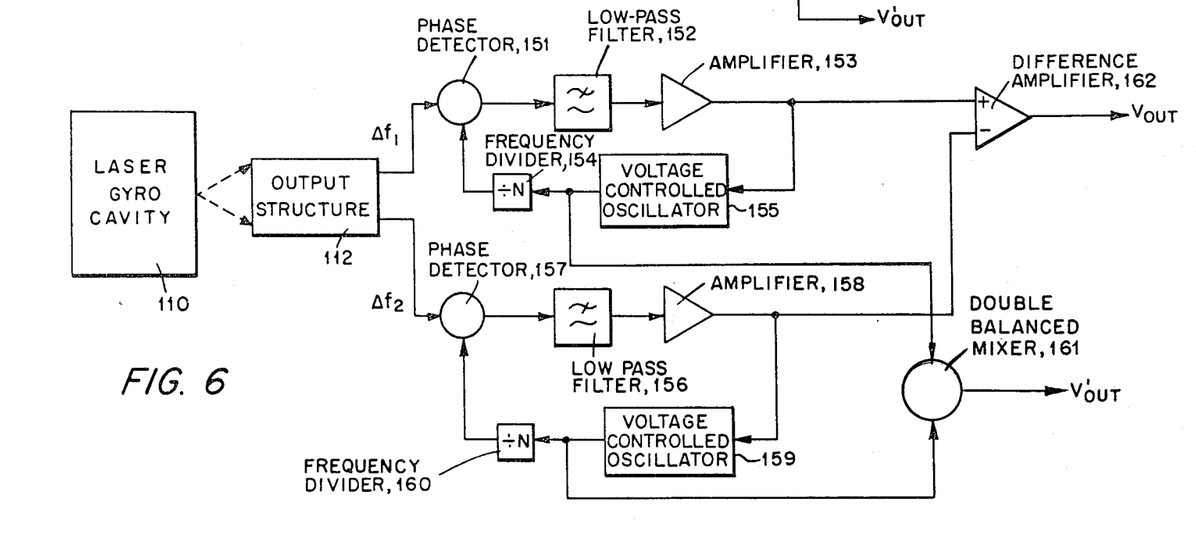

Referring now to the view of FIG. 6, there is shown a block diagram of still another embodiment of the invention. This embodiment employs two phase-locked loop circuits producing an output signal $V_{out}$ which again has a frequency N times that of $\Delta f$. With the embodiment shown in FIG. 6, however, it is not necessary to actually produce the $\Delta f$ signal. A highly precise analog output signal $V_{out}$ is nonetheless produced in direct proportion to the rate of rotation of the system.

The $\Delta f_1$ signal from output structure 112 is coupled to the input of phase detector 151 while the $\Delta f_2$ signal is coupled to the corresponding input of phase detector 157. The outputs of phase detectors 151 and 157 are coupled through low-pass filters 152 and 156 to amplifiers 153 and 158 as in previously described embodiments. The outputs of amplifiers 153 and 158, again as in previously described embodiments, are coupled back to the inputs of phase detectors 151 and 157 through voltage-controlled oscillators 155 and 159 and frequency dividers 154 and 160.

The highly precise analog output signal $V_{out}$ is produced by forming the difference between the output signals from amplifiers 153 and 158 through difference amplifier 162. Besides providing a highly precise analog indication of the rate of rotation the polarity of the $V_{out}$ signal indicates the direction of rotation of the system.

The outputs of voltage controlled oscillators 155 and 159 are coupled to the two inputs of double balanced mixer 161. The output signal $V'_{out}$ from double balanced mixer 161 has a frequency which, as in the previously described embodiments, is in direct proportion to the rate of rotation of the system with the quantization error reduced by a factor of N.

Figure 7:
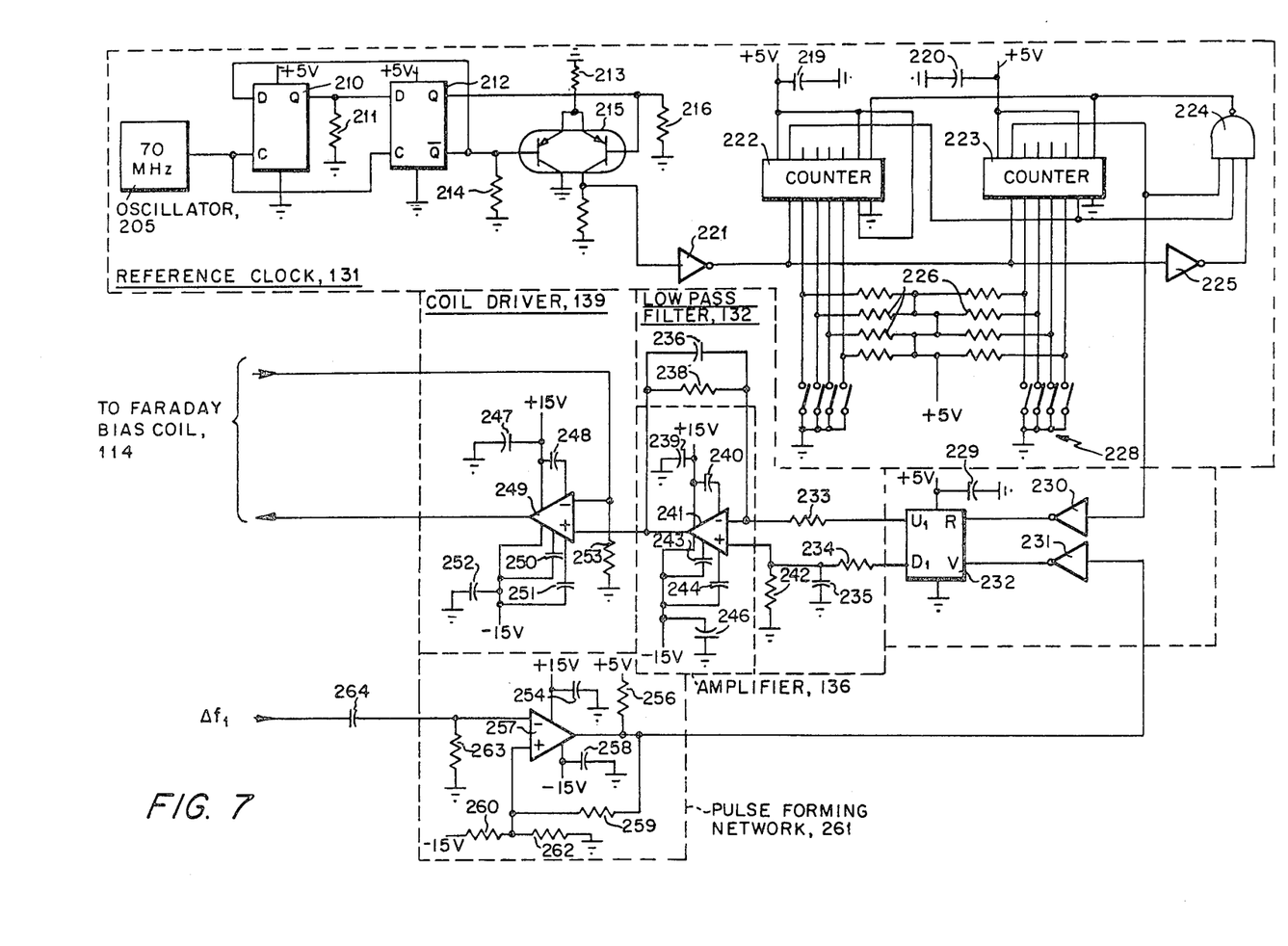
FIGS. 7 and 8 taken together are a detailed schematic diagram of the embodiment of the invention shown in FIG. 4.

In FIG. 7 is shown a schematic diagram of the phase-locked loop circuitry coupled to the $\Delta f_1$ signal. The sinusoidally shaped $\Delta f_1$ signal is coupled through capacitor 264 to pulse forming network 261 which converts the sinusoidal signal to pulse form with one pulse being generated for each cycle of the $\Delta f_1$ signal. Pulse forming network 261 is not shown in the block diagram view of FIG. 4 as it may not always be needed depending upon the form of the $\Delta f_1$ signal produced by the output structure of the gyro system. Pulse forming network 261 includes threshold detector 257 connected in a Schmidt trigger configuration so that noise present upon the $\Delta f_1$ signal does not cause false triggering.

The output of pulse forming network 261 is coupled through inverter 231 to one input of phase detector 130. Phase detector 130 is functionally implemented by integrated circuit digital phase detector 232. Integrated circuit phase detector 232 has two output lines U1 and D1. If, for example, the R input leads in phase the V input, the U1 output will remain at a fixed positive DC voltage while the D1 output will be pulsed with low going pulses of a width depending upon the phase difference. If the V input leads the R input, the D1 output will remain at the fixed positive voltage while the U1 output is pulsed.

Reference clock 131 produces a pulsed signal of controllable frequency which is coupled to the R input of phase detector 130 through inverter 230. As it is generally easier to obtain very stable frequency sources at frequencies of, for example, 50 MHz and above, a 70 MHz oscillator 205 provides the initial clock pulse source for reference clock 131. The output of oscillator 205 is coupled to the clock inputs of emitter coupled logic flip-flops 210 and 212. A divide by four function is provided by these two flip-flops. The inverted and noninverted outputs of flip-flop 212 are coupled to the base inputs of dual transistor 215. Transistor 215 is coupled in a differential amplifier configuration and biased so as to convert the emitter coupled logic output levels from flip-flop 212 to levels acceptable for transistor-transistor logic circuitry. The output is taken across collector resistor 218 and coupled to the input of inverter 221. Inverter 221 provides clock buffering to the clock inputs of four-bit binary counters 222 and 223. Counters 222 and 223 are connected serially in a count-down configuration. Switches 227 and 228 are coupled to the preset inputs of the counters with biasing provided by resistors 226. A reset pulse for both counters 222 and 223 is produced at the output NAND gate 224 each time a count of zero is reached. The output signal to phase detector 130 is taken as the highest order bit output from counter 223. In this configuration, counters 222 and 223 provide a variable pulse frequency dividing circuit with the division factor determined by the settings of switches 227 and 228. In systems operation, switches 227 and 228 are set to provide a zero phase difference output from phase detector 130 when the system is inertially at rest.

The U1 and D1 outputs from integrated circuit phase detector 232 are coupled through resistors 233 and 234 to the inverting and noninverting inputs respectively of integrated differential amplifier circuit 241 within amplifier 136. Frequency compensation is provided to amplifier circuit 241 with capacitors 240, 243, and 244. The function of low-pass filter 132 is provided by two seperate RC circuits, one formed of resistor 242 and capacitor 235, is coupled between the noninverting input of amplifier circuit 241 and ground. The other, formed of resistor 238 and capacitor 236 is coupled in a feed-back arrangement between the output and noninverting input of amplifier circuit 241. The output of amplifier circuit 241 is coupled to the input of coil driver amplifier 139 at the noninverting input of amplifier circuit 249. Faraday bias coil 114 is coupled between the output of amplifier circuit 249 and its inverting input. Frequency compensation is provided amplifier circuit 249 by capacitors 248, 250, and 251.

The operation of the $\Delta f_2$ phase-locked loop will be explained with reference to FIG. 8. The $\Delta f_2$ signal is coupled to pulse forming network 305 through capacitor 304. Pulse forming network 305 functions as in the circuit of FIG. 7. The circuitry and operation of phase detector 133 is also the same as described in conjunction with FIG. 7 as is that of low-pass filter 134 and amplifier 137.

The output of amplifier circuit 322 within amplifier 322 is coupled through resistor 338 to the control voltage input of VCO integrated circuit 340 within voltage-controlled oscillator 138. VCO circuit 340 has a 70 MHz output for a zero value of input signal. As is well known in the voltage-controlled oscillator art, the RF output of VCo circuit 340 varies in proportion to the changes in the input signal.

The output from voltage-controlled oscillator 138 is coupled to the input of frequency divider 135. Frequency divider 135 operates in the same manner as the similar circuit in FIG. 7. The value of N is set by switches 360 and 361. N is predetermined by the relationship $f_{vco}/\Delta f_2$ where $\Delta f_2$ is taken for the system at rest. For the chosen value of $f_{vco} = 70$ MHz for the output frequency from voltage-controlled oscillator 138 for a zero input and for a typical value of $\Delta f_2$ of 300 KHz, N=233.

Figure 8:
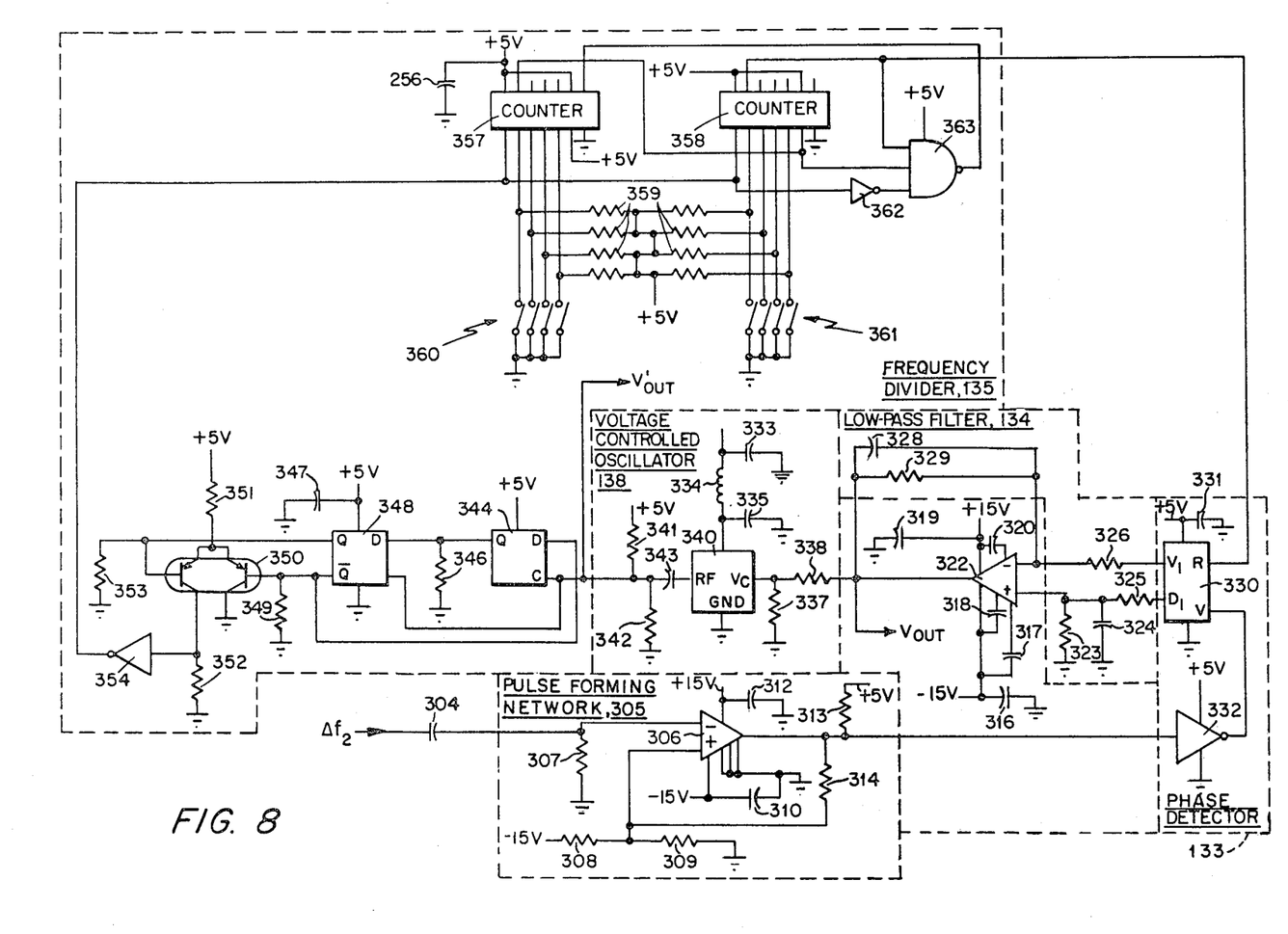

Although the circuits of FIGS. 7 and 8 have been described in conjunction with the block diagram of FIG. 4, each of the circuits of FIGS. 7 and 8 may function in the circuits indicated by the other block diagrams shown herein for the equivalent circuits indicated.

Figure 9:
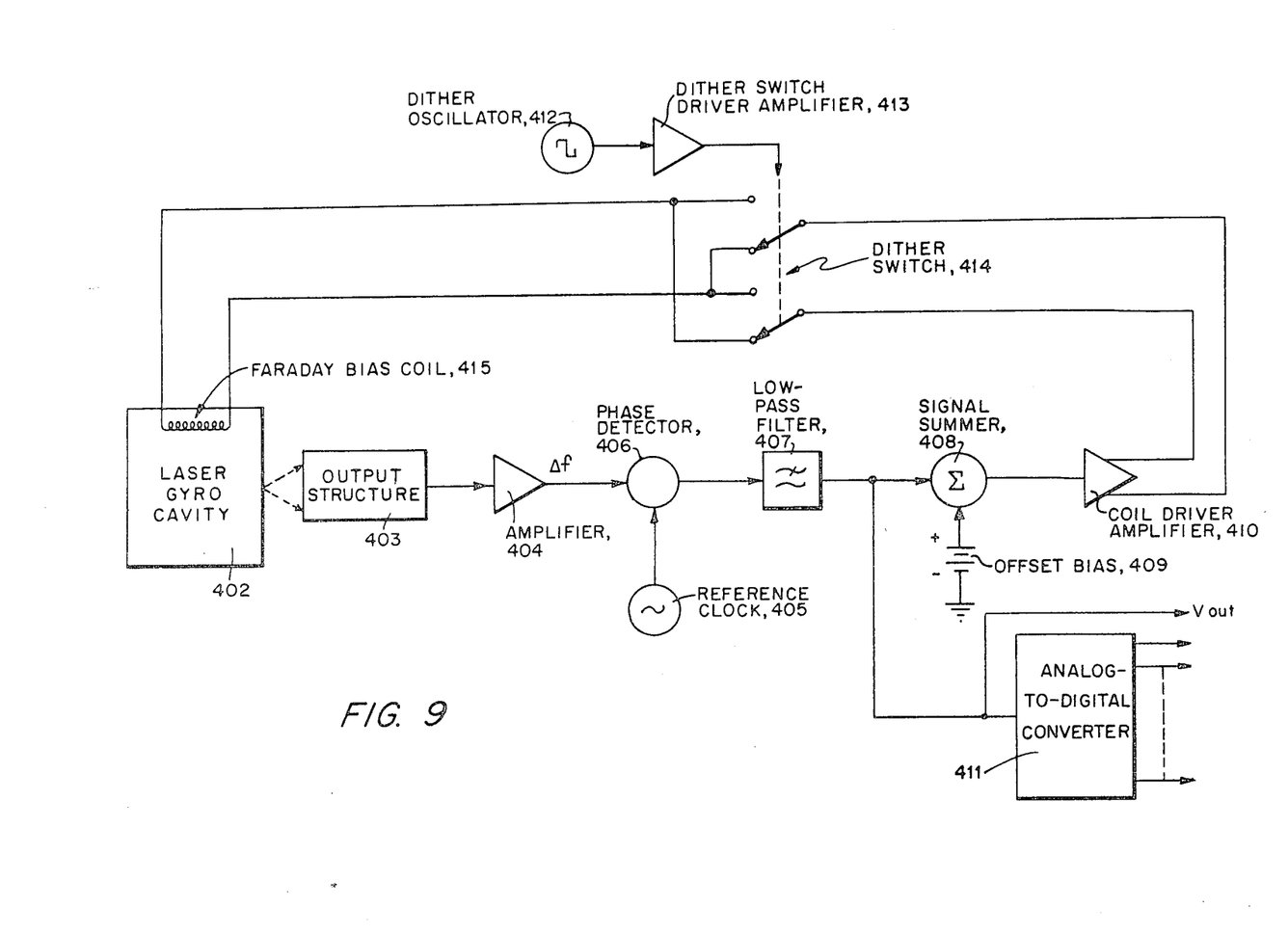

Referring next to the diagram of FIG. 9, there will be described an embodiment of the invention which operates using a two-frequency laser gyro cavity. Laser gyro cavity 402 as shown in FIG. 9 is similar to laser gyro cavity 110 of FIG. 1 but with crystal rotator 17 omitted. Of course, other configurations of two-frequency laser gyroscope cavities may be used as well. The two output beams from laser gyro cavity 402 are optically coupled to output structure 403 which beats the beams together forming an output signal having a frequency equal to the difference in frequency between the two beams. This difference frequency signal is amplified by amplifier 404. The amplified signal is coupled to one input of phase detector 406.

The other input of phase detector 406 is coupled to the output of reference clock source 405. Reference clock source 405 produces an output signal of constant frequency and phase. Phase detector 406 thereby produces an output signal which has a parameter related to the difference in phase between the frequency difference signal and signal produced by reference clock source 405. This may be represented, for example, as an amplitude or pulse width on one or more output lines. The output of phase detector 406 is passed through low-pass filter 407 which produces an output control signal having an amplitude in proportion to the phase difference between the two input signals to phase detector 406. This control signal is summed by signal summer 408 with an offset bias voltage 409 of fixed amplitude. The amplitude of the bias signal is determined so as to produce the desired amount of frequency splitting between the two beams at inertial rest and for the expected range of rates of rotation.

The summed signal is amplified and buffered by coil driver amplifier 410. The output of coil driver amplifier 410 is coupled back to Faraday bias coil 415 through dither switch 414. Dither switch 414 is cyclically moved back and forth between the two positions shown to successively pass the current through Faraday bias coil 415 first in one direction then the other. This is the well-known dither technique used in previous two-frequency laser gyroscope systems. However, in such systems, there is no feedback component present in the current coupled to the Faraday bias coil. Dither switch 414 which is preferably implemented as an electronic switch such as by using field effect transistors, is operated by dither switch driver amplifier 413 which amplifies the symmetric square wave output from dither oscillator 412.

In this embodiment the output of low-pass filter 407 may be used directly as an analog output signal indicative of the rate of rotation. Also, there is provided an analog-to-digital converter 411 for converting the output signal $V_{out}$ to digital form.

In still another embodiment, the Zeeman effect is used to maintain a constant frequency difference. In that embodiment, the feedback coil is positioned around the laser gain medium. The magnetic field produced in the gain medium by the current flowing in the coil determines the amount of frequency difference between the various beams. This technique may be used in either dithered or non-dithered systems and may be used in combination with separate Faraday bias splitting.

This concludes the description of the preferred embodiments of the invention. Although preferred embodiments have been described, it is believed that numerous modifications and alterations thereto would be apparent to one having ordinary skill in the art without departing from the spirit and scope of the invention.

APPENDIX

Parts List for Circuits of FIGS. 7 & 8

Resistors

| | |
|---|---|
| 211, 214, 216, 346, 349, 353 | 560 |
| 213, 351 | 100 |
| 218, 352 | 330 |
| 226, 337, 359 | 1K |
| 233, 234, 325, 326 | 5.6K |
| 238, 242, 323, 329 | 150K |
| 253, 262, 263, 307, 309 | 10K |
| 256, 313 | 1.8K |
| 259, 314 | 220K |
| 260, 308 | 1.5M |
| 338 | 4.7K |
| 341 | 200 |
| 342 | 3.9K |

Capacitors

| | |
|---|---|
| 219, 220, 333, 335, 347, 356 | 470 pf. |
| 240, 248, 320 | 1500 pf. |
| 253, 236, 324, 328 | 0.047 Mf. |
| 239, 243, 244, 246, 247, 250, 251, 252, 254, 258, 304, 310, 312, 316, 317, 318, 319, 331 | 0.1 Mf. |
| 264, 343 | 1000 pf. |

Coils

| | |
|---|---|
| 114 | 35.4 turns #34 magnet wire, ¼" diameter |
| 334 | 1 MH. |

Transistors

| | |
|---|---|
| 215, 350 | 2N3810 |

Integrated Circuits

| | |
|---|---|
| 210, 212, 357, 358 | Motorola MECL 10131 |
| 221, 225, 230, 231, 332, 354, 362 | Texas Instruments SN 74H04 |
| 222, 223, 357, 358 | Fairchild 93516DC |
| 224, 363 | Texas Instruments SN 74H10 |
| 232, 330 | Motorola MC 4344 |
| 257, 305 | National LM119 |
| 340 | Motorola K1085A-375-73-70 MHz. |

What is claimed is:

1. In combination:
   means for providing a closed-loop path for sustaining propagation of at least two circularly polarized counter-rotating electromagnetic waves of different frequencies;
   means for providing a predetermined frequency difference between said two counter-rotating waves when said path is at rest;
   means for producing an electrical signal having a frequency equal to the difference in frequency between said two counter-rotating waves;
   phase detecting means for producing a signal as a function of the difference in phase between said electrical signal and a reference signal; and
   means, coupled to the output of said phase detecting means, for providing an indication of the rotation rate of said closed-loop path.

2. The combination of claim 1 wherein said closed-loop path providing means comprises:
   at least three reflecting means; and
   a laser gain medium.

3. The combination of claim 2 wherein said closed-loop path providing means further comprises:
   first and second frequency dispersive elements disposed in said path.

4. The combination of claim 3 wherein said output signal from said path comprises:
   an electrical signal having a frequency equal to the difference in frequency between two of said electromagnetic waves.

5. The combination of claim 3 wherein said phase-locked loop further comprises:
   means for varying the difference in frequency between at least two of said electromagnetic waves.

6. In combination:
   means for providing a closed-loop path for sustaining propagation of two counter-rotating electromagnetic waves of different frequencies;
   means for providing a predetermined frequency difference between said counter-rotating waves when said path is at rest;
   means for producing a first signal having a frequency equal to the difference in frequency between said two counter-rotating electromagnetic waves;
   means for producing a second signal of a predetermined fixed frequency;
   phase detecting means for producing a third signal having an amplitude in proportion to the difference in phase between said first and second signals;
   means for varying the frequency difference between said two counter-rotating electromagnetic waves as a function of said third signal; and
   means for producing an output signal responsive to said third signal, said output signal providing a measure of the rotation rate of said closed-loop path.

7. The combination of claim 6 wherein:
   said frequency varying means maintains said frequency difference at a constant value over a predetermined range of rates of rotation of said path providing means.

8. The combination of claim 7 wherein said phase-locked loop for producing said third signal further comprises:
   low-pass filter means, said first and second signals being coupled to inputs of said phase detector.

9. The combination of claim 8 further comprising:
   means for amplifying said third signal, said frequency varying means being coupled to the output of said amplifying means.

10. The combination of claim 9 further comprising:
    means for summing said third signal with a fixed voltage.

11. The combination of claim 9 further comprising:
    means for repetitively changing the direction of current flow through said frequency varying means.

12. In combination:
    means for providing a closed-loop path for sustaining propagation of two counter-rotating electromagnetic waves of different frequencies;
    a detector for producing a first signal having a frequency equal to the difference in frequency between said two counter-rotating waves;
    phase locking means comprising a phase detector having said first signal coupled to a first input thereof;
    means for producing a second signal of fixed frequency;
    said second signal being coupled to a second input of said phase detector;
    low-pass filtering means coupled to the output of said phase detector;
    means for amplifying the output of said low-pass filtering means;

a coil coupled to the output of said means for amplifying the output of said low-pass filtering means, said coil being positioned to vary said frequency difference as a function of the field produced by said coil; and means responsive to the output of said amplifying means for providing an output signal indicative of the rotation rate of said closed-loop path.

13. The combination of claim 12 further comprising:
means for cyclically changing the direction of current flow through said coil.

14. The combination of claim 13 wherein said means for cyclically changing the direction of current flow through said coil comprises:

switching means coupled to the output of said means for amplifying the output of said low-pass filtering means; and means for cyclically operating said switching means.

15. The combination of claim 12 further comprising:
means for converting an analog signal to a digital signal, the input of said converting means being coupled to the output of said low-pass filtering means.

16. The combination of claim 12 further comprising:
means for summing the output of said low-pass filtering means with a fixed voltage.

17. The combination of claim 12 wherein said cavity comprises:

a Faraday rotator element, said coil being positioned so that the field produced by said coil extends within said Faraday rotator element.

18. The combination of claim 13 wherein said cavity comprises:

a laser gain medium said coil being positioned so that the field produced by said coil extends within said laser gain medium.

19. The combination of claim 12 further comprising:
means for amplifying said first signal prior to its connection to said phase detector.

20. In combination:

means for providing a closed-loop propagation path for sustaining propagation of electromagnetic waves of different frequencies;

means for producing a difference signal having a frequency equal to the difference in frequency between two counter-rotating ones of said waves;

phase detecting means for producing a phase difference signal as a function of the difference in phase between said difference signal and a reference signal; and means responsive to said phase difference signal for producing an output signal which varies as a function of the rotation rate of said propagation path.

21. The combination of claim 20 wherein:
said phase-locked loop further comprises a low-pass filter coupled to the output of said phase detector and said output signal is provided by the output signal of said low-pass filter.

22. The combination of claim 21 wherein:
said output signal is a continuous analog signal.

23. The combination of claim 20 further comprising:
means for varying the frequency difference between said two counter-rotating waves as a function of said error signal.

24. In combination:
means for providing a closed-loop propagation path for sustaining propagation of electromagnetic waves of different frequencies;

means for producing a difference signal having a frequency equal to the difference in frequency between two counter-rotating ones of said waves;

means for producing a reference signal;

phase detecting means for producing a phase locked control signal having a parameter determined by the difference in phase between said difference signal and said reference signal;

means for varying the frequency difference between said two of said waves as a function of said control signal; and means for producing an output signal indicative of the rotation rate of said propagation path as a function of said control signal.

* * * * *